United States Patent
Katogi et al.

(10) Patent No.: US 12,555,769 B2
(45) Date of Patent: Feb. 17, 2026

(54) NONAQUEOUS ELECTROLYTE SECONDARY BATTERY

(71) Applicant: SANYO Electric Co., Ltd., Kadoma (JP)

(72) Inventors: Akihiro Katogi, Tokushima (JP); Noriko Sugii, Tokushima (JP); Takamitsu Tashita, Tokushima (JP); Fumikazu Mizukoshi, Osaka (JP); Mai Yokoi, Tokushima (JP)

(73) Assignee: PANASONIC ENERGY CO., LTD., Osaka (JP)

(*) Notice: Subject to any disclaimer, the term of this patent is extended or adjusted under 35 U.S.C. 154(b) by 767 days.

(21) Appl. No.: 17/783,502

(22) PCT Filed: Dec. 4, 2020

(86) PCT No.: PCT/JP2020/045151
§ 371 (c)(1),
(2) Date: Jun. 8, 2022

(87) PCT Pub. No.: WO2021/117615
PCT Pub. Date: Jun. 17, 2021

(65) Prior Publication Data
US 2023/0018422 A1    Jan. 19, 2023

(30) Foreign Application Priority Data
Dec. 13, 2019    (JP) .................. 2019-225072

(51) Int. Cl.
*H01M 4/133* (2010.01)
*H01M 4/131* (2010.01)
(Continued)

(52) U.S. Cl.
CPC ........... *H01M 4/133* (2013.01); *H01M 4/131* (2013.01); *H01M 4/70* (2013.01);
(Continued)

(58) Field of Classification Search
CPC ........ H01M 4/133; H01M 4/131; H01M 4/70; H01M 10/0587; H01M 50/469;
(Continued)

(56) References Cited

U.S. PATENT DOCUMENTS

2006/0151318 A1    7/2006    Park et al.
2014/0287316 A1    9/2014    Ahn et al.
(Continued)

FOREIGN PATENT DOCUMENTS

JP    11-60790 A    3/1999
JP    H11-214042 A    8/1999
(Continued)

OTHER PUBLICATIONS

JP-2015511389-A Description Translated (Year: 2015).*
(Continued)

*Primary Examiner* — Matthew T Martin
*Assistant Examiner* — Kevin Song
(74) *Attorney, Agent, or Firm* — WHDA, LLP

(57) ABSTRACT

A negative electrode comprises a negative electrode collector, a first negative electrode mixture layer that is provided on the surface of the negative electrode collector, and a second negative electrode mixture layer that faces the positive electrode; the first negative electrode mixture layer and the second negative electrode mixture layer contain graphite particles; the ratio of the void fraction (S2) among the graphite particles in the second negative electrode mixture layer to the void fraction (S1) among the graphite particles in the first negative electrode mixture layer, namely S2/S1 is from 1.1 to 2.0; the ratio of the packing density (D2) of the second negative electrode mixture layer to the packing density (D1) of the first negative electrode mixture layer,
(Continued)

namely D2/D1 is from 0.9 to 1.1; and the separator has a thickness of 10 μm or less, while having a porosity of from 25% to 45%.

3 Claims, 2 Drawing Sheets

(51) Int. Cl.
  *H01M 4/70* (2006.01)
  *H01M 10/0587* (2010.01)
  *H01M 50/469* (2021.01)
  *H01M 4/02* (2006.01)

(52) U.S. Cl.
  CPC ..... *H01M 10/0587* (2013.01); *H01M 50/469* (2021.01); *H01M 2004/021* (2013.01); *H01M 2004/027* (2013.01)

(58) Field of Classification Search
  CPC ..... H01M 2004/021; H01M 2004/027; H01M 10/0422; H01M 50/107; H01M 50/417; H01M 4/587; Y02E 60/10
  See application file for complete search history.

(56) References Cited

U.S. PATENT DOCUMENTS

| | | | |
|---|---|---|---|
| 2015/0280221 A1 | 10/2015 | Abdelsalam et al. | |
| 2015/0340731 A1 | 11/2015 | Kim et al. | |
| 2016/0049637 A1 | 2/2016 | Sohn et al. | |
| 2016/0204431 A1* | 7/2016 | Sawa | H01M 4/366 429/218.1 |
| 2017/0084898 A1 | 3/2017 | Stokes et al. | |
| 2018/0080711 A1 | 3/2018 | Ho et al. | |
| 2018/0358650 A1 | 12/2018 | Takahashi et al. | |
| 2019/0027740 A1 | 1/2019 | Lee et al. | |
| 2020/0365878 A1 | 11/2020 | Ishikawa et al. | |
| 2021/0104731 A1 | 4/2021 | Min et al. | |
| 2023/0018422 A1 | 1/2023 | Katogi et al. | |
| 2023/0025345 A1 | 1/2023 | Sugii et al. | |

FOREIGN PATENT DOCUMENTS

| | | | | |
|---|---|---|---|---|
| JP | 2003-77463 A | | 3/2003 | |
| JP | 2006-196457 A | | 7/2006 | |
| JP | 2007-214038 A | | 8/2007 | |
| JP | 2007335166 A | * | 12/2007 | |
| JP | 2015511389 A | * | 4/2015 | ......... H01M 4/0404 |
| JP | 2015-537347 A | | 12/2015 | |
| JP | 2016-42460 A | | 3/2016 | |
| JP | 2018-529200 A | | 10/2018 | |
| JP | 2019071167 A | | 5/2019 | |
| JP | 2020-95853 A | | 6/2020 | |
| JP | 2020-145143 A | | 9/2020 | |
| KR | 20180125312 A | | 8/2025 | |
| WO | 2017085900 A1 | | 5/2017 | |
| WO | 2018070703 A1 | | 4/2018 | |
| WO | 2019/131195 A1 | | 7/2019 | |

OTHER PUBLICATIONS

JP-2015511389-A Claims Translated (Year: 2015).*
JP-2007335166-A Description Translated (Year: 2007).*
JP-2007335166-A Claims Translated (Year: 2007).*
International Search Report dated Feb. 22, 2021, issued in counterpart International Application No. PCT/JP2020/045151, w/English Translation. (6 pages).
International Search Report dated Feb. 2, 2021, issued in counterpart International Application No. PCT/JP2020/043104 (2 pages).
Extended (Supplementary)European Search Report dated Apr. 28, 2023, issued in counterpart EP Application No. 20892986.9. (pages).
Office Action dated Nov. 15, 2023, issued in counterpart CN Application No. 202080081687.X, with English translation. (13 pages).
Final Office Action dated May 9, 2025, issued in U.S. Appl. No. 17/779,731, (10 pages).
Final Office Action dated Jan. 23, 2025, issued in U.S. Appl. No. 17/779,731, (25 pages).

* cited by examiner

NONAQUEOUS ELECTROLYTE SECONDARY BATTERY

CROSS-REFERENCE TO RELATED APPLICATIONS

This application is a national stage of International Application No. PCT/JP2020/045151, filed Dec. 4, 2020, which claims priority to Japanese Patent Application No. 2019-225072 filed Dec. 13, 2019 both of which are hereby incorporated by reference in their entirety.

TECHNICAL FIELD

The present disclosure relates to a non-aqueous electrolyte secondary battery.

BACKGROUND ART

A non-aqueous electrolyte secondary battery using graphite particles as a negative electrode active material is widely utilized as a high-capacity secondary battery. While an increase in packing density per unit volume of a negative electrode active material in a negative electrode mixture layer can lead to an increase in battery capacity, such an increase in packing density of a negative electrode active material has the problem of leading to small voids between the negative electrode active materials to cause deterioration in impregnation with an electrolyte solution, resulting in a reduction in battery capacity according to a charge-discharge cycle (rapid charge-discharge cycle) where rapid charge is repeated.

Patent Literature 1 discloses an ultrathin microporous membrane made of polyethylene, having a low degree of porosity. However, such a microporous membrane is poor in liquid retention properties, and thus impregnation in a negative electrode cannot be improved and rapid charge-discharge cycle characteristics of a secondary battery cannot be improved.

Meanwhile, in the inventions disclosed in Patent Literatures 2 to 4, the packing density of a negative electrode active material in a negative electrode mixture layer is lower on an outer surface side than a current collector side, leading to large voids between the negative electrode active materials on the outer surface side to result in an enhancement in impregnation with an electrolyte solution. However, the amount per unit volume of the negative electrode active material in the negative electrode mixture layer is decreased and thus a problem is that the battery capacity is reduced. Accordingly, even if the microporous membrane made of polyethylene disclosed in Patent Literature 1 is applied to each of the inventions disclosed in Patent Literatures 2 to 4, both a high capacity and excellent rapid charge-discharge cycle characteristics cannot be satisfied.

CITATION LIST

Patent Literature

PATENT LITERATURE 1: Japanese Unexamined Patent Application Publication No. Hei 11-60790
PATENT LITERATURE 2: Japanese Unexamined Patent Application Publication No. 2003-77463
PATENT LITERATURE 3: Japanese Unexamined Patent Application Publication No. 2006-196457
PATENT LITERATURE 4: Japanese Translation of PCT International Application Publication No. 2015-511389

SUMMARY

Technical Problem

It is an advantage of the present disclosure is to provide a non-aqueous electrolyte secondary battery not only high in capacity, but also suppressed in deterioration in rapid charge-discharge cycle characteristics.

Solution to Problem

A non-aqueous electrolyte secondary battery of one aspect of the present disclosure comprises an electrode assembly including a positive electrode and a negative electrode facing each other with a porous separator interposed therebetween, a non-aqueous electrolyte, and an exterior body that houses the electrode assembly and the non-aqueous electrolyte. The negative electrode has a negative electrode current collector, a first negative electrode mixture layer provided on a surface of the negative electrode current collector, and a second negative electrode mixture layer facing the positive electrode with the separator being interposed therebetween, the first negative electrode mixture layer and the second negative electrode mixture layer each include graphite particles, a ratio (S2/S1) of a rate of voids between the graphite particles in the second negative electrode mixture layer (S2) to a rate of voids between the graphite particles in the first negative electrode mixture layer (S1) is 1.1 to 2.0, a ratio (D2/D1) of a packing density of the second negative electrode mixture layer (D2) to a packing density of the first negative electrode mixture layer (D1) is 0.9 to 1.1, and the separator has a thickness of 10 μm or less and a degree of porosity of 25% to 45%.

Advantageous Effects of Invention

According to one aspect of the present disclosure, a non-aqueous electrolyte secondary battery not only high in capacity, but also capable of being suppressed in deterioration in rapid charge-discharge cycle characteristics can be provided.

DESCRIPTION OF EMBODIMENTS

A non-aqueous electrolyte secondary battery of one aspect of the present disclosure comprises an electrode assembly including a positive electrode and a negative electrode facing each other with a porous separator interposed therebetween, a non-aqueous electrolyte, and an exterior body that houses the electrode assembly and the non-aqueous electrolyte. The negative electrode has a negative electrode current collector, a first negative electrode mixture layer provided on a surface of the negative electrode current collector, and a second negative electrode mixture layer facing the positive electrode with the separator being interposed therebetween, the first negative electrode mixture layer and the second negative electrode mixture layer each include graphite particles, the ratio (S2/S1) of the rate of voids between the graphite particles in the second negative electrode mixture layer (S2) to the rate of voids between the graphite particles in the first negative electrode mixture layer (S1) is 1.1 to 2.0, the ratio (D2/D1) of the packing density of the second negative electrode mixture layer (D2) to the packing density of the first negative electrode mixture layer (D1) is 0.9 to 1.1, and the separator has a thickness of 10 µm or less and a degree of porosity of 25% to 45%.

Hereinafter, an exemplary embodiment of a cylindrical-type secondary battery of the present disclosure will be described in detail with reference to drawings. In the following description, specific shapes, materials, numerical values, directions, and the like are illustrative for facilitating understanding of the present invention, and can be appropriately modified depending on the specification of the cylindrical-type secondary battery. An exterior body is not limited to a cylindrical-type body, and may be, for example, rectangular. When a plurality of embodiments and variants are included in the following description, it has been expected from the beginning that feature portions are appropriately combined and used.

Figure 1:
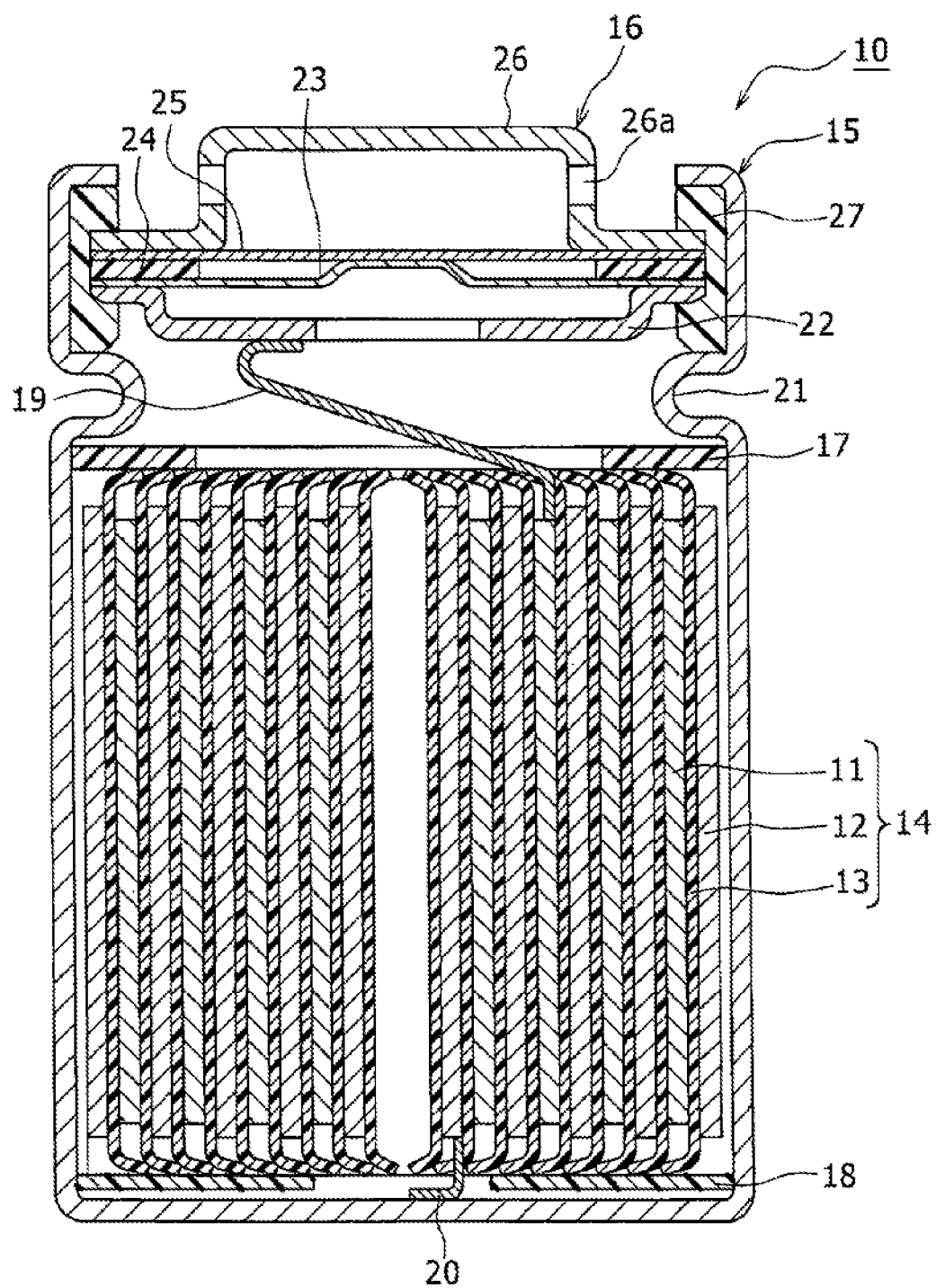
FIG. 1 is a sectional view along the axial direction of a cylindrical-type secondary battery of an exemplary embodiment.

FIG. 1 is an axial sectional view of a cylindrical-type secondary battery 10 of an exemplary embodiment. In the secondary battery 10 shown in FIG. 1, an electrode assembly 14 and a non-aqueous electrolyte (not shown) are housed in an exterior body 15. The electrode assembly 14 has a wound-type structure formed by winding a positive electrode 11 and a negative electrode 12 with a porous separator 13 being interposed therebetween. Hereinafter, there will be described under the assumption that a sealing assembly 16 side is "upper" and a bottom side of the exterior body 15 is "lower", for the purpose of illustration.

An opening end of the exterior body 15 is blocked by a sealing assembly 16, and thus the interior of the secondary battery 10 is tightly sealed. Respective insulating plates 17 and 18 are disposed on and under the electrode assembly 14. A positive electrode lead 19 passes through a though-hole in the insulating plate 17 and extends upward, and is welded to the lower surface of a filter 22, which is the bottom board of the sealing assembly 16. In the secondary battery 10, a cap 26, which is the top board of the sealing assembly 16 and electrically connected to the filter 22, serves as a positive electrode terminal. On the other hand, a negative electrode lead 20 passes through a though-hole in the insulating plate 18 and extends toward the bottom of the exterior body 15, and is welded to the inner surface of the bottom of the exterior body 15. In the secondary battery 10, the exterior body 15 serves as a negative electrode terminal. When the negative electrode lead 20 is placed on a terminal portion, the negative electrode lead 20 passes on the outside of the insulating plate 18 and extends toward the bottom of the exterior body 15, and is welded to the inner surface of the bottom of the exterior body 15.

The exterior body 15 is, for example, a cylindrical metal container having a closed-end. A gasket 27 is disposed between the exterior body 15 and the sealing assembly 16 to ensure that the interior of the secondary battery 10 is tightly sealed. The exterior body 15 has, for example, a grooved portion 21 which is formed by pressing a lateral surface from outside and which supports the sealing assembly 16. The grooved portion 21 is preferably formed annularly along the circumferential direction of the exterior body 15, and the upper surface thereof supports the sealing assembly 16 via the gasket 27.

The sealing assembly 16 has the filter 22, a lower vent member 23, an insulating member 24, an upper vent member 25, and the cap 26 which are stacked in the listed order from the electrode assembly 14 side. Each of the members constituting the sealing assembly 16 has, for example, a disk or ring shape, and the members other than the insulating member 24 are electrically connected to each other. The lower vent member 23 and the upper vent member 25 are connected to each other at respective middle portions and the insulating member 24 is interposed between respective circumferences. If the inner pressure of the battery increases by abnormal heat generation, for example, the lower vent member 23 ruptures to thereby cause the upper vent member 25 to swell toward the cap 26 and separate from the lower vent member 23, thereby breaking the electrical connection between the members. If the inner pressure further increases, the upper vent member 25 ruptures to discharge gas through an opening 26a of the cap 26.

Hereinafter, the positive electrode 11, the negative electrode 12, the separator 13 and the non-aqueous electrolyte constituting the secondary battery 10, in particular, a negative electrode active material included in a negative electrode mixture layer 32 constituting the negative electrode 12 will be described in detail.

[Negative Electrode]

Figure 2:
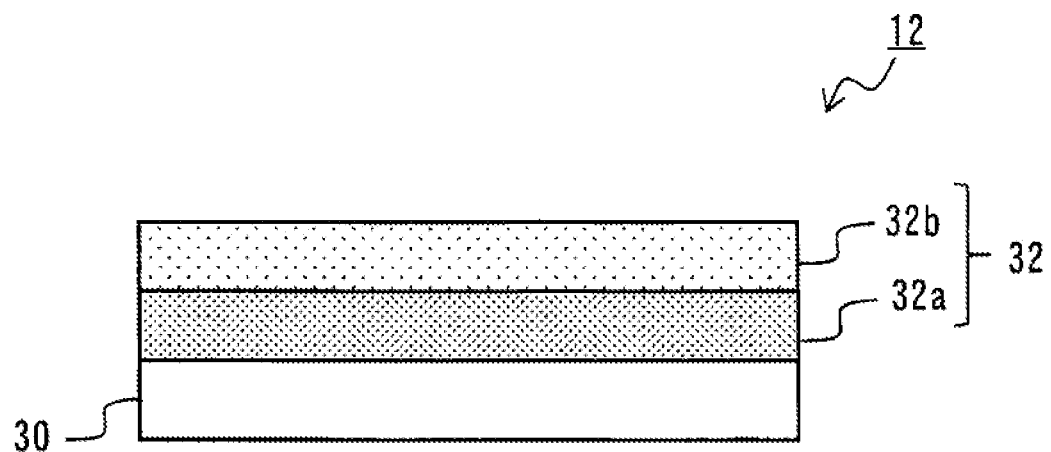
FIG. 2 is a sectional view of a negative electrode of an exemplary embodiment.

FIG. 2 is a sectional view of a negative electrode 12 of an exemplary embodiment. The negative electrode 12 has a negative electrode current collector 30, a first negative electrode mixture layer 32a disposed on a surface of the negative electrode current collector 30, and a second negative electrode mixture layer 32b disposed on a surface of the first negative electrode mixture layer 32a. The thickness of the first negative electrode mixture layer 32a and the thickness of the second negative electrode mixture layer 32b may be the same or different from each other. The thickness ratio between the first negative electrode mixture layer 32a and the second negative electrode mixture layer 32b is, for example, 3:7 to 7:3, preferably 4:6 to 6:4, more preferably 5:5 to 6:4.

The negative electrode current collector 30 here used is, for example, foil of a metal, such as copper, which is stable in the electric potential range of the negative electrode, or a film in which such a metal is disposed on an outer layer. The thickness of the negative electrode current collector 30 is, for example, 5 µm to 30 µm.

The first negative electrode mixture layer 32a and the second negative electrode mixture layer 32b (hereinafter, the first negative electrode mixture layer 32a and the second negative electrode mixture layer 32b may be sometimes collectively referred to as negative electrode mixture layer 32) each include graphite particles. The negative electrode mixture layer 32 preferably includes, for example a binder. Examples of the binder include fluoro resins, polyacrylonitrile (PAN), polyimide resins, acrylic resins, polyolefin resins, styrene-butadiene rubber (SBR), nitrile-butadiene rubber (NBR), carboxymethyl cellulose (CMC) or salts thereof, poly(acrylic acid) (PAA) or salts thereof (PAA-Na, PAA-K, and the like which may be partially neutralized salts), and poly(vinyl alcohol) (PVA). These may be used singly or may be used in combinations of two or more thereof.

Examples of the graphite particles for use in the present embodiment include natural graphite and artificial graphite. The plane spacing ($d_{002}$) of the (002) plane with respect to the graphite particles for use in the present embodiment, according to a wide-angle X-ray diffraction method, is, for example, preferably 0.3354 nm or more, more preferably 0.3357 nm or more, and preferably less than 0.340 nm, more preferably 0.338 nm or less. The crystallite size (Lc(002)) with respect to the graphite particles for use in the present embodiment, as determined according to an X-ray diffraction method, is, for example, preferably 5 nm or more, more preferably 10 nm or more, and preferably 300 nm or less, more preferably 200 nm or less. When the plane spacing ($d_{002}$) and the crystallite size (Lc(002)) satisfy the above respective ranges, the battery capacity of the secondary battery 10 tends to increase as compared with when the above respective ranges are not satisfied.

The graphite particles included in the first negative electrode mixture layer 32a can be produced as follows, for example. The graphite particles having a desired size are obtained by pulverizing coke (precursor) serving as a main raw material, to a predetermined size, firing and graphitizing such a precursor pulverized, which is aggregated by a binder and then further pressure molded into a block, at a temperature of 2600° C. or more, and then sieving the resultant. The internal porosity of the graphite particles can be here adjusted by the particle size of the precursor pulverized, the particle size of the precursor aggregated, and the like. For example, the average particle size (median size D50 in terms of volume, the same applies to the following) of the precursor pulverized is preferably in the range from 12 µm to 20 µm. The internal porosity of the graphite particles can also be adjusted by the amount of a volatile component added to the block molded product. When a portion of the binder added to the coke (precursor) volatilizes in firing, the binder can be used as a volatile component. Examples of such a binder include pitch.

The graphite particles included in the second negative electrode mixture layer 32b can be produced as follows, for example. The graphite particles having a desired size are obtained by pulverizing coke (precursor) serving as a main raw material, to a predetermined size, firing and graphitizing such a precursor pulverized, which is aggregated by a binder such as pitch, at a temperature of 2600° C. or more, and then sieving the resultant. The internal porosity of the graphite particles can be adjusted by the particle size of the precursor pulverized, the particle size of the precursor aggregated, and the like. For example, the average particle size of the precursor pulverized is preferably in the range from 12 µm to 20 µm.

The ratio (S2/S1) of the rate of voids between the graphite particles in the second negative electrode mixture layer 32b (S2) to a rate of voids between the graphite particles in the first negative electrode mixture layer 32a (S1) is 1.1 to 2.0, preferably 1.1 to 1.7, more preferably 1.1 to 1.5. If the S2/S1 is less than 1.1, impregnation with an electrolyte solution is deteriorated, and the battery capacity is reduced due to repeating of rapid charge.

If the S2/S1 is more than 2.0, the packing density of the second negative electrode mixture layer 32b, described below, cannot be substantially the same as the packing density of the first negative electrode mixture layer 32a, and the battery capacity is low. The rate of voids between the graphite particles is here a two dimensional value determined from the percentage of the area of the voids between the graphite particles to the cross sectional area of the negative electrode mixture layer 32. S2/S1 is determined by calculating the rate of voids between the graphite particles in the first negative electrode mixture layer 32a (S1) and the rate of voids between the graphite particles in the second negative electrode mixture layer 32b (S2) by the following procedure.

<Method for Measuring Rate of Voids Between Graphite Particles>

(1) The cross section of the negative electrode mixture layer is exposed. Examples of the method for exposing the cross section include a method involving cutting out a portion of the negative electrode and processing the resultant with an ion milling apparatus (for example, IM4000PLUS manufactured by Hitachi High-Tech Corporation) to expose the cross section of the negative electrode mixture layer.

(2) A reflection electron image of the cross section exposed of the negative electrode active material layer is taken with a scanning electron microscope, with respect to each layer of the first negative electrode mixture layer 32a and the second negative electrode mixture layer 32b. The magnification in taking of the reflection electron image is, for example, 800×.

(3) The cross section image obtained as described above is imported into a computer and binarized with image analysis software (for example, ImageJ manufactured by National Institutes of Health), thereby obtaining an image binarized, in which the cross section of each particle in the cross section image is converted into a black image and any void present in the cross section of such each particle is converted into a white image.

(4) The area of voids between the graphite particles is calculated with, as each of voids between the graphite particles, a portion excluding voids in the graphite particles (pores not linked to the surface of the particle) and pores having a width of 3 µm or less, linked to the surface of the graphite particle, among voids each converted into the white image, in each of the images binarized of the first negative electrode mixture layer 32a and the second negative electrode mixture layer 32b. The rate of voids between the graphite particles can be calculated based on the following expression.

Rate of voids between graphite particles=Area of voids between graphite particles/Area of cross section of negative electrode mixture layer×100

S1 and S2 can be each determined as the average value in the measurement performed three times, and S1/S2 can be calculated from these values.

The ratio (D2/D1) of the packing density of the second negative electrode mixture layer 32b (D2) to the packing density of the first negative electrode mixture layer 32a (D1) is 0.9 to 1.1. S2/S1 satisfies 1.1 to 2.0 and also D2/D1 is in the range, and thus a reduction in battery capacity can be suppressed. For example, S2/S1 and D2/D1 can each satisfy the above range by allowing the internal porosity of the graphite particles included in the first negative electrode mixture layer 32a to be higher than the internal porosity of the graphite particles included in the second negative electrode mixture layer 32b.

The packing density of the first negative electrode mixture layer 32a (D1) and the packing density of the second negative electrode mixture layer 32b (D2) can be each, for example, 1.3 g/cm³ to 2.0 g/cm³.

The packing density of the negative electrode mixture layer 32 means the mass per unit volume of the negative electrode mixture layer 32. First, the negative electrode 12 is used and the first negative electrode mixture layer 32a and the second negative electrode mixture layer 32b are each subjected to measurement of the mass per unit area, of the mixture. The thickness of each mixture layer of the first negative electrode mixture layer 32a and the second negative electrode mixture layer 32b is measured from the cross section image obtained in calculation of the rate of voids between the particles. When the thickness of such each mixture layer is not stable, the thickness can be measured at ten points in the above image and the average value can be adopted as the thickness of such each mixture layer. The packing density of the first negative electrode mixture layer 32*a* (D1) and the packing density of the second negative electrode mixture layer 32*b* (D2) can be each calculated by dividing the mass per unit area, of the mixture, by the thickness of such each mixture layer. The ratio (D2/D1) of the packing density of the second negative electrode mixture layer 32*b* (D2) to a packing density of the first negative electrode mixture layer 32*a* (D1) is obtained from these values.

Next, a specific method for forming the first negative electrode mixture layer 32*a* and the second negative electrode mixture layer 32*b* is described. For example, first, a negative electrode active material including graphite particles (hereinafter, sometimes referred to as first graphite particles), a binder, and a solvent such as water are mixed to prepare a first negative electrode mixture slurry. A negative electrode active material including graphite particles (hereinafter, sometimes referred to as second graphite particles) different from the first graphite particles, a binder, and a solvent such as water are mixed to separately prepare a second negative electrode mixture slurry. Both sides of the negative electrode current collector is coated with the first negative electrode mixture slurry, the resultant coatings are dried, thereafter both sides of a coating of the first negative electrode mixture slurry are coated with the second negative electrode mixture slurry, and the resultant coatings are dried. Furthermore, the first negative electrode mixture layer 32*a* and the second negative electrode mixture layer 32*b* can be rolled by a roller to thereby form a negative electrode mixture layer 32.

Even if the first negative electrode mixture layer 32*a* and the second negative electrode mixture layer 32*b* are rolled simultaneously as described above, respective packing properties in rolling of the first graphite particles and the second graphite particles are not necessarily the same. For example, the respective particle size distributions of the first graphite particles and the second graphite particles can be changed to adjust the respective packing densities of the first negative electrode mixture layer 32*a* and the second negative electrode mixture layer 32*b*. The internal porosity of the second graphite particles can be lower than the internal porosity of the first graphite particles to thereby lead to an increase in rate of voids between the particles without any excessive reduction in packing density of the second negative electrode mixture layer 32*b*. While the coating with the second negative electrode mixture slurry is made after coating with the first negative electrode mixture slurry and drying of the resultant, the coating with the second negative electrode mixture slurry may also be made after coating with the first negative electrode mixture slurry and before drying of the resultant. The first negative electrode mixture layer 32*a* may also be coated with the second negative electrode mixture slurry after coating with the first negative electrode mixture slurry and drying and rolling of the resultant. Rolling conditions of the first negative electrode mixture layer 32*a* and the second negative electrode mixture layer 32*b* can be changed to thereby more freely adjust the respective packing densities.

At least any one of the group consisting of the first negative electrode mixture layer 32*a* and the second negative electrode mixture layer 32*b* may include a Si material. The Si material is a material that can reversibly intercalate and deintercalate lithium ions, and functions as a negative electrode active material. Examples of the Si material include Si, an alloy including Si, and silicon oxide represented by $SiO_x$ (x is 0.8 to 1.6). The Si material is a negative electrode material that can more enhance battery capacity than graphite particles. The content of the Si material is, for example, preferably 1 mass % to 10 mass %, more preferably 3 mass % to 7 mass % based on the mass of the negative electrode active material in view of, for example, an enhancement in battery capacity and suppression of deterioration in rapid charge-discharge cycle characteristics.

Examples of such other material that can reversibly intercalate and deintercalate lithium ions include a metal to be alloyed with lithium, such as tin (Sn), or an alloy or oxide including a metal element such as Sn. The negative electrode active material may include such other material, and the content of such other material is, for example, desirably 10 mass % or less based on the mass of the negative electrode active material.

[Positive Electrode]

The positive electrode 11 is configured from, for example, a positive electrode current collector of metal foil or the like, and a positive electrode mixture layer formed on the positive electrode current collector. The positive electrode current collector here used can be, for example, foil of a metal, such as aluminum, which is stable in the electric potential range of the positive electrode, or a film in which such a metal is disposed on an outer layer. The positive electrode mixture layer includes, for example, a positive electrode active material, a binder, and a conductive agent.

The positive electrode 11 can be produced by, for example, coating the positive electrode current collector with a positive electrode mixture slurry including, for example, a positive electrode active material, a binder, and a conductive agent, and drying the resultant to thereby form the positive electrode mixture layer, and then rolling the positive electrode mixture layer.

Examples of the positive electrode active material can include a lithium transition metal oxide containing a transition metal element such as Co, Mn, or Ni. Examples of the lithium transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, $Li_2MPO_4F$ (M; at least one of Na, Mg, Sc, Y, Mn, Fe, Co, Ni, Cu, Zn, Al, Cr, Pb, Sb, and B, $0<x≤1.2$, $0<y≤0.9$, $2.0≤z≤2.3$). These may be used singly or a plurality thereof may be mixed and used. The positive electrode active material preferably includes a lithium/nickel complex oxide such as $Li_xNiO_2$, $Li_xCo_yNi_{1-y}O_2$, or $Li_xNi_{1-y}M_yO_z$ (M; at least one of Na, Mg, Sc, Y, Mn, Fe, Co, Ni, Cu, Zn, Al, Cr, Pb, Sb, and B, $0<x≤1.2$, $0<y≤0.9$, $2.0≤z≤2.3$) from the viewpoint that the capacity of the non-aqueous electrolyte secondary battery can be increased.

Examples of the conductive agent include carbon particles such as carbon black (CB), acetylene black (AB), Ketjenblack, and graphite. These may be used singly or may be used in combinations of two or more thereof.

Examples of the binder include fluoro resins such as polytetrafluoroethylene (PTFE) and poly(vinylidene fluoride) (PVdF), polyacrylonitrile (PAN), polyimide resins, acrylic resins, and polyolefin resins. These may be used singly or may be used in combinations of two or more thereof.

[Separator]

For example, an ion-permeable and insulating porous sheet is used as the separator 13. Specific examples of the porous sheet include a microporous film, woven fabric, and nonwoven fabric. Suitable examples of the material for the separator include olefin resins such as polyethylene and polypropylene, and cellulose. The separator 13 may be a laminate including a cellulose fiber layer and a layer of fibers of a thermoplastic resin such as an olefin resin. The separator may be a multi-layered separator including a polyethylene layer and a polypropylene layer, and a surface of the separator 13 to be used may be coated with a material such as an aramid resin or ceramic.

The thickness of the separator 13 is 10 µm or less. This can lead to an enhancement in battery capacity. The thickness of the separator 13 is preferably 6 µm or more in view of strength.

The degree of porosity of the separator 13 is 25% to 45%. This range can lead to maintaining of strength and also an improvement in impregnation with an electrolyte, even if the thickness of the separator 13 is thin, and can allow a battery not only high in capacity, but also suppressed in deterioration in rapid charge-discharge cycle characteristics to be obtained. The degree of porosity of the separator 13 can be calculated based on the following expression.

Degree of porosity of separator=[1−{Mass of separator/(Thickness of separator×Area of main surface of separator×True density of material constituting separator)}]×100

[Non-Aqueous Electrolyte]

The non-aqueous electrolyte includes a non-aqueous solvent and an electrolyte salt dissolved in the non-aqueous solvent. The non-aqueous electrolyte is not limited to a liquid electrolyte (electrolyte solution), and may be a solid electrolyte using a gel polymer or the like. Examples of the non-aqueous solvent that can be used include esters, ethers, nitriles such as acetonitrile, amides such as dimethylformamide, and any mixed solvent of two or more thereof. The non-aqueous solvent may contain a halogen-substituted product formed by replacing at least a portion of hydrogen of any of the above solvents with a halogen atom such as fluorine.

Examples of the esters include cyclic carbonate esters such as ethylene carbonate (EC), propylene carbonate (PC), and butylene carbonate, chain carbonate esters such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylate esters such as γ-butyrolactone and γ-valerolactone, and chain carboxylate esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, di phenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Preferable examples of the halogen-substituted product for use include a fluorinated cyclic carbonate ester such as fluoroethylene carbonate (FEC), a fluorinated chain carbonate ester, and a fluorinated chain carboxylate ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6+x}(C_nF_{2n+1})_x$ (where 1<x<6, and n is 1 or 2), $LiB_{10}Cl_{10}$, LiCl, LiBr, LiI, chloroborane lithium, lithium lower aliphatic carboxylate, borate salts such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {where 1 and m are integers of 1 or more}. These lithium salts may be used singly or a plurality thereof may be mixed and used. Among these, $LiPF_6$ is preferably used in view of ionic conductivity, electrochemical stability, and other properties. The concentration of the lithium salt is preferably 0.8 to 1.8 mol per liter of the solvent.

EXAMPLES

Hereinafter, the present disclosure will be further described with reference to Examples, but the present disclosure is not intended to be limited to such Examples.

Example 1

[Production of Positive Electrode]

Aluminum-containing lithium nickel cobaltate ($LiNi_{0.88}Co_{0.09}Al_{0.03}O_2$) was used as a positive electrode active material. Mixed were 100 parts by mass of the positive electrode active material, 1 part by mass of graphite as a conductive agent, and 0.9 parts by mass of a poly (vinylidene fluoride) powder as a binder, and an appropriate amount of N-methyl-2-pyrrolidone (NMP) was further added thereto to prepare a positive electrode mixture slurry. Both sides of a positive electrode current collector made of aluminum foil (thickness 15 µm) were coated with the slurry by a doctor blade method, and the resultant coatings were dried and then rolled by a roller to thereby produce a positive electrode in which a positive electrode mixture layer was formed on each of both sides of the positive electrode current collector.

[Production of Graphite Particles A]

Pitch as a binder was added to coke having an average particle size of 17 µm, and the resultant was aggregated. To such an aggregated product was applied isotropic pressure, and a block molded product having a density of 1.6 g/cm$^3$ to 1.9 g/cm$^3$ was produced. The block molded product was fired and graphitized at a temperature of 2800° C., and then the molded product was pulverized and sieved, to thereby produce graphite particles A having an average particle size of 23 µm.

[Production of Graphite Particles B]

Pitch as a binder was added to coke having an average particle size of 13 µm, and the resultant was aggregated until the average particle size reached 18 µm. The aggregated product was fired and graphitized at a temperature of 2800° C., and then sieved, to thereby produce graphite particles B having an average particle size of 23 µm. In production of graphite particles B, the amount of the pitch added to the coke was smaller than the amount of the pitch used in production of graphite particles A and also the average particle size of the aggregated product was adjusted, to thereby produce graphite particles B having a lower internal porosity than that of graphite particles A.

[Production of Negative Electrode]

Mixed were 95 parts by mass of graphite particles A and 5 parts by mass of SiO, and the resulting mixture was adopted as negative electrode active material A. Negative electrode active material A, carboxymethyl cellulose (CMC), and styrene-butadiene copolymer rubber (SBR) were mixed such that the mass ratio thereof was 100:1:1, and the mixture was kneaded in water, to thereby prepare a first negative electrode mixture slurry. Mixed were 95 parts by mass of graphite particles B and 5 parts by mass of SiO, and the resulting mixture was adopted as negative electrode active material B. Negative electrode active material B, carboxymethyl cellulose (CMC), and styrene-butadiene copolymer rubber (SBR) were mixed such that the mass ratio thereof was 100:1:1, and the mixture was kneaded in water, to thereby prepare a second negative electrode mixture slurry.

Both sides of a negative electrode current collector made of copper foil were coated with the first negative electrode mixture slurry by a doctor blade method, and the resultant coatings were dried to thereby form a first negative electrode mixture layer. The first negative electrode mixture layer was further coated with the second negative electrode mixture slurry, and the resultant coating was dried to thereby form a second negative electrode mixture layer. The coating mass ratio per unit area between the first negative electrode mixture slurry and the second negative electrode mixture slurry was here 5:5. The first negative electrode mixture layer and the second negative electrode mixture layer were rolled by a roller to thereby produce a negative electrode.

[Production of Non-Aqueous Electrolyte]

Five parts by mass of vinylene carbonate (VC) was added to 100 parts by mass of a non-aqueous solvent obtained by ethylene carbonate (EC) and dimethyl carbonate in a volume ratio of 1:3, $LiPF_6$ was dissolved therein at a concentration of 1.5 mol/L, and the resultant was adopted as a non-aqueous electrolyte.

[Production of Non-Aqueous Electrolyte Secondary Battery]

(1) A microporous membrane made of polypropylene, having a thickness of 6 μm and a degree of porosity of 35%, was used as a separator.

(2) After a positive electrode lead was attached to the positive electrode current collector and a negative electrode lead was attached to the negative electrode current collector, the positive electrode and the negative electrode were wound with the separator being interposed therebetween, to thereby produce a wound-type electrode assembly.

(3) Respective insulating plates were disposed on and under the electrode assembly, the negative electrode lead was welded to an exterior body, and the positive electrode lead was welded to the sealing assembly, to thereby house the electrode assembly in the exterior body.

(4) The non-aqueous electrolyte was injected in the exterior body by a depressurizing system, the opening end of the exterior body was then sealed by the sealing assembly via a gasket, and the resultant was adopted as a non-aqueous electrolyte secondary battery.

[Calculation of Rate of Voids between Graphite Particles]

Each of the non-aqueous electrolyte secondary batteries was charged to 4.2 V at a constant current of 0.2 C (920 mA) and then charged to C/50 at a constant voltage of 4.2 V under an environmental temperature of 25° C. Thereafter, each of the batteries was discharged to 2.5 V at a constant current of 0.2 C. Such charge and discharge were defined as one cycle, and performed for 5 cycles. The negative electrode was taken out from each of the non-aqueous electrolyte secondary batteries of Examples and Comparative Examples after 5 cycles, and the rate of voids between the graphite particles was calculated.

[Measurement of Capacity Retention Rate in Rapid Charge-Discharge Cycle]

Each of the non-aqueous electrolyte secondary batteries of Examples and Comparative Examples was charged to 4.2 V at a constant current of 1 C (4600 mA) and then charged to 1/50 C at a constant voltage of 4.2 V under an environmental temperature of 25° C. Thereafter, each of the batteries was discharged to 2.5 V at a constant current of 0.5 C. Such charge and discharge were defined as one cycle, and performed for 100 cycles. According to the following expression, the capacity retention rate in a rapid charge-discharge cycle of each of the non-aqueous electrolyte secondary batteries of Examples and Comparative Examples was determined.

Capacity retention rate=(Discharge capacity at $100^{th}$ cycle/Discharge capacity at $1^{st}$ cycle)×100

Example 2

A non-aqueous electrolyte secondary battery was produced and evaluated in the same manner as in Example 1 except that the degree of porosity of the separator was changed to 45%.

Example 3

A non-aqueous electrolyte secondary battery was produced and evaluated in the same manner as in Example 1 except that the thickness and the degree of porosity of the separator were respectively changed to 10 μm and 45%.

Comparative Example 1

A non-aqueous electrolyte secondary battery was produced and evaluated in the same manner as in Example 1 except that both negative electrode active material A included in the first negative electrode mixture slurry and negative electrode active material B included in the second negative electrode mixture slurry were mixed such that 47.5 parts by mass of graphite particles A, 47.5 parts by mass of graphite particles B and 5 parts by mass of SiO were achieved.

Comparative Example 2

A non-aqueous electrolyte secondary battery was produced and evaluated in the same manner as in Example 2 except that both negative electrode active material A included in the first negative electrode mixture slurry and negative electrode active material B included in the second negative electrode mixture slurry were mixed such that 47.5 parts by mass of graphite particles A, 47.5 parts by mass of graphite particles B and 5 parts by mass of SiO were achieved.

Comparative Example 3

A non-aqueous electrolyte secondary battery was produced and evaluated in the same manner as in Example 3 except that both negative electrode active material A included in the first negative electrode mixture slurry and negative electrode active material B included in the second negative electrode mixture slurry were mixed such that 47.5 parts by mass of graphite particles A, 47.5 parts by mass of graphite particles B and 5 parts by mass of SiO were achieved.

Comparative Example 4

A non-aqueous electrolyte secondary battery was produced and evaluated in the same manner as in Example 1 except that the thickness and the degree of porosity of the separator were respectively changed to 10 µm and 45%.

Comparative Example 5

A non-aqueous electrolyte secondary battery was produced and evaluated in the same manner as in Comparative Example 4 except that both negative electrode active material A included in the first negative electrode mixture slurry and negative electrode active material B included in the second negative electrode mixture slurry were mixed such that 47.5 parts by mass of graphite particles A, 47.5 parts by mass of graphite particles B and 5 parts by mass of SiO were achieved.

Table 1 summarized the results of the capacity retention rate and the battery capacity in the rapid charge-discharge cycle of each of the non-aqueous electrolyte secondary batteries of Examples and Comparative Examples. The battery capacity was more highly evaluated, as the separator not contributing to charge and discharge was thinner. Table 1 also showed the degree of porosity of the separator, D1, D2, D2/D1, and S2/S1. It was indicated that, as the value of the capacity retention rate in the rapid charge-discharge cycle was higher, deterioration in rapid charge-discharge cycle characteristics was more suppressed.

REFERENCE SIGNS LIST

10 secondary battery, 11 positive electrode, 12 negative electrode, 13 separator, 14 electrode assembly, 15 exterior body, 16 sealing assembly, 17, 18 insulating plate, 19 positive electrode lead, 20 negative electrode lead, 21 grooved portion, 22 filter, 23 lower vent member, 24 insulating member, 25 upper vent member, 26 cap, 26a opening, 27 gasket, 30 negative electrode current collector, 32 negative electrode mixture layer, 32a first negative electrode mixture layer, 32b second negative electrode mixture layer

The invention claimed is:

1. A non-aqueous electrolyte secondary battery comprising:
   an electrode assembly including a positive electrode and a negative electrode facing each other with a porous separator interposed therebetween;
   a non-aqueous electrolyte; and
   an exterior body that houses the electrode assembly and the non-aqueous electrolyte; wherein
   the negative electrode has a negative electrode current collector, a first negative electrode mixture layer provided on a surface of the negative electrode current collector, and a second negative electrode mixture layer facing the positive electrode with the separator being interposed therebetween,
   the first negative electrode mixture layer and the second negative electrode mixture layer each include graphite particles,

TABLE 1

| | Separator | | Graphite particles | | Packing density (g/m³) | | Ratio | Ratio (S2/S1) | Results of evaluation | |
|---|---|---|---|---|---|---|---|---|---|---|
| | Thickness (µm) | Degree (%) of porosity | Lower layer | Upper layer | First layer (D1) | Second layer (D2) | (D2/D1) of packing densities | of porosities between particles | Capacity retention rate (%) | Battery capacity |
| Example 1 | 6 | 35 | A | B | 1.59 | 1.49 | 0.94 | 1.39 | 75.6 | Excellent |
| Example 2 | 6 | 45 | A | B | 1.59 | 1.49 | 0.94 | 1.39 | 85.8 | Excellent |
| Example 3 | 10 | 45 | A | B | 1.59 | 1.49 | 0.94 | 1.39 | 81.6 | Good |
| Comparative Example 1 | 6 | 35 | A + B | A + B | 1.51 | 1.51 | 1.00 | 0.94 | 55.1 | Excellent |
| Comparative Example 2 | 6 | 45 | A + B | A + B | 1.51 | 1.51 | 1.00 | 0.94 | 68.3 | Excellent |
| Comparative Example 3 | 10 | 45 | A + B | A + B | 1.51 | 1.51 | 1.00 | 0.94 | 61.1 | Good |
| Comparative Example 4 | 16 | 45 | A | B | 1.59 | 1.49 | 0.94 | 1.39 | 72.3 | Poor |
| Comparative Example 5 | 16 | 45 | A + B | A + B | 1.51 | 1.51 | 1.00 | 0.94 | 59.8 | Poor |

First layer: first negative electrode mixture layer;
second layer: second negative electrode mixture layer In Examples, a high capacity retention rate was obtained as compared with Comparative Examples, and both a high capacity and excellent rapid charge-discharge cycle characteristics could be satisfied. The reason for improvements in rapid charge-discharge cycle characteristics is considered because voids between the particles in the second negative electrode mixture layer are increased to thereby lead to an enhancement in impregnation with an electrolyte solution in the negative electrode. In addition, no excessive reduction in packing density of the second negative electrode mixture layer and use of a separator having predetermined thickness and degree of porosity contribute to an increase in capacity of the secondary battery.

an average particle size of the graphite particles included in the first negative electrode mixture layer is identical to an average particle size of the graphite particles included in the second negative electrode mixture layer,
an internal porosity of the graphite particles included in the first negative electrode mixture layer is higher than an internal porosity of the graphite particles included in the second negative electrode mixture layer,
a ratio (S2/S1) of a rate of voids between the graphite particles in the second negative electrode mixture layer (S2) to a rate of voids between the graphite particles in the first negative electrode mixture layer (S1) is 1.1 to 2.0, a ratio (D2/D1) of a packing density of the second negative electrode mixture layer (D2) to a packing density of the first negative electrode mixture layer (D1) is 0.9 to 1.1, and the separator has a thickness of 10 μm or less and a degree of porosity of 25% to 45%.

2. The non-aqueous electrolyte secondary battery according to claim 1, wherein the packing density of the first negative electrode mixture layer (D1) and the packing density of the second negative electrode mixture layer (D2) are 1.3 g/cm$^3$ 0 to 2.0 g/cm$^3$.

3. The non-aqueous electrolyte secondary battery according to claim 1, wherein at least any one of the group consisting of the first negative electrode mixture layer and the second negative electrode mixture layer includes a Si material.

\* \* \* \* \*